(12) United States Patent
Collier et al.

(10) Patent No.: US 7,441,114 B2
(45) Date of Patent: Oct. 21, 2008

(54) METHODS AND SYSTEMS FOR MANAGEMENT AND CONTROL OF AN AUTOMATION CONTROL MODULE

(75) Inventors: David Scott Collier, Charlottesville, VA (US); Ferrell Louis Mercer, Madison, VA (US); Jason Daniel Kadingo, Palmyra, VA (US); Brad J. Bolfing, Charlottesville, VA (US)

(73) Assignee: GE FANUC Automation North America, Inc., Charlottesville, VA (US)

( * ) Notice: Subject to any disclaimer, the term of this patent is extended or adjusted under 35 U.S.C. 154(b) by 803 days.

(21) Appl. No.: 10/241,665

(22) Filed: Sep. 10, 2002

(65) Prior Publication Data

US 2004/0049674 A1   Mar. 11, 2004

(51) Int. Cl.
*H04L 9/00* (2006.01)
*H04Q 7/00* (2006.01)
*G05B 11/01* (2006.01)
*G05B 15/00* (2006.01)

(52) U.S. Cl. .................. 713/152; 455/422.1; 700/18; 700/83

(58) Field of Classification Search ............. 713/152; 709/217, 220, 223
See application file for complete search history.

(56) References Cited

U.S. PATENT DOCUMENTS

| | | | | |
|---|---|---|---|---|
| 5,469,150 A | * | 11/1995 | Sitte | 340/3.42 |
| 5,805,442 A | * | 9/1998 | Crater et al. | 700/9 |
| 6,061,603 A | * | 5/2000 | Papadopoulos et al. | 700/83 |
| 6,321,272 B1 | * | 11/2001 | Swales | 709/250 |
| 6,437,692 B1 | * | 8/2002 | Petite et al. | 340/540 |
| 6,484,061 B2 | | 11/2002 | Papadopoulos et al. | |
| 6,523,063 B1 | * | 2/2003 | Miller et al. | 709/206 |
| 6,640,140 B1 | * | 10/2003 | Lindner et al. | 700/18 |
| 6,721,607 B2 | * | 4/2004 | Brault | 700/18 |
| 6,799,202 B1 | * | 9/2004 | Hankinson et al. | 709/219 |
| 6,847,995 B1 | * | 1/2005 | Hubbard et al. | 709/223 |
| 6,857,013 B2 | * | 2/2005 | Ramberg et al. | 709/223 |
| 6,895,472 B2 | * | 5/2005 | Neiman et al. | 711/118 |
| 6,941,369 B1 | * | 9/2005 | Krack et al. | 709/225 |
| 6,954,792 B2 | * | 10/2005 | Kang et al. | 709/229 |
| 6,985,953 B1 | * | 1/2006 | Sandhu et al. | 709/229 |
| 7,010,396 B2 | | 3/2006 | Ware et al. | |
| 7,035,898 B1 | | 4/2006 | Baker | |
| 7,139,591 B2 | | 11/2006 | Callaghan et al. | |
| 7,146,408 B1 | * | 12/2006 | Crater et al. | 709/219 |
| 7,216,007 B2 | | 5/2007 | Johnson | |
| 7,225,037 B2 | | 5/2007 | Shani | |
| 2002/0161793 A1 | * | 10/2002 | Stahl | 707/500 |
| 2003/0033376 A1 | * | 2/2003 | Brownhill et al. | 709/218 |
| 2003/0204560 A1 | * | 10/2003 | Chen et al. | 709/203 |
| 2005/0144601 A1 | * | 6/2005 | Lo | 717/140 |

* cited by examiner

*Primary Examiner*—Matthew Smithers
*Assistant Examiner*—Techane J Gergiso
(74) *Attorney, Agent, or Firm*—Mark A. Conklin, Esq.; Armstrong Teasdale LLP

(57) ABSTRACT

An automation control module (ACM) including an ACM central processing unit (CPU) and a web system electrically connected to the ACM CPU. The web system is configured to process security layer encrypted hypertext transfer protocol (HTTP) requests from a network.

24 Claims, 2 Drawing Sheets

METHODS AND SYSTEMS FOR MANAGEMENT AND CONTROL OF AN AUTOMATION CONTROL MODULE

BACKGROUND OF THE INVENTION

This invention relates generally to automation control modules (ACMs) and more particularly to management and control of ACMs.

Remote monitoring and control of systems and processes have taken many forms. In the past, dedicated lines became the most common form of communication between a control system and a remote location. However, such systems have limited application since the control systems are not accessible from multiple locations. Modems have made it possible to access the control system from different locations, but these types of systems are generally restricted to downloading and uploading data files. Moreover, providing any type of control function between locations is rather limited in this type of environment.

Programmable logic controllers (PLCs) are widely used in industry and process control. At least some known systems provide factory automation information using various types of communication networking environments. These networks are usually slow, are not universally accessible and are limited to monitoring and data exchange. Control may be implemented, but since the communication networks are non-deterministic, control is not in real time. Specialized industrial networks using proprietary fieldbus alternatives can be very expensive. Conversion products are required to allow information carried over those networks to be visible on a general purpose network. There may be significant installation and other deployment costs associated with the existence of such intermediate devices.

At least some known applications and programs for ACMs are executed on general purpose computers that communicate with the ACMs over proprietary networks and protocols. However, developing and maintaining the proprietary networks and protocol increases the cost of ACM systems. Furthermore, because access to ACM data is typically restricted, communication between the general purpose computer and the ACM must be handled in a secure manner. As a result, such additional security measures also increases an overall cost of the ACM systems.

BRIEF DESCRIPTION OF THE INVENTION

In one aspect, an automation control module (ACM) is provided including an ACM central processing unit (CPU) and a web system electrically connected to the ACM CPU. The web system is configured to process security layer encrypted hypertext transfer protocol (HTTP) requests from a network.

In another aspect, an automation control module (ACM) system is provided including an ACM, a network, a computer electrically connected to said network and configured to communicate with the network, and a web subsystem electrically connected to the ACM and the network. The web subsystem is configured to process security layer encrypted hypertext transfer protocol (HTTP) requests from received from the computer through the network.

In yet another aspect, a method is provided for management and control of an automation control module (ACM). The ACM includes an ACM central processing unit (CPU) and a web system electrically connected to the ACM and a network. The method includes electrically connecting the web system to the ACM CPU and processing secure layer encrypted hypertext transfer protocol (HTTP) requests from the network using the web system.

DETAILED DESCRIPTION OF THE INVENTION

Set forth below are descriptions of embodiments of methods and systems for control and management of an automation control module (ACM). The methods and systems facilitate viewing and controlling ACM data through standard networks, protocols, and browsers, developing and downloading user-defined web pages that include ACM data, and controlling the access level to the ACM and user-defined web pages.

The methods and systems are not limited to the specific embodiments described herein. Rather, components of each system and the associated steps of each method can be practiced independent and separate from other components and steps described herein. Each component and step can also be used in combination with other components and steps.

As used herein, the term ACM refers to any device used to control the automation of an activity, including but not limited to PLCs, computer numeric controls (CNCs), motion control products, home automation products, and commercial automation products. As used herein, ACM data includes different types of data within an ACM system 10 that control operation of ACM system 10. For example, ACM data includes, but is not limited to, user logic programs, user program memory, ACM status and statistics, ACM faults, setting ACM operating states, setting privilege levels, and any other useful ACM information.

Figure 1:
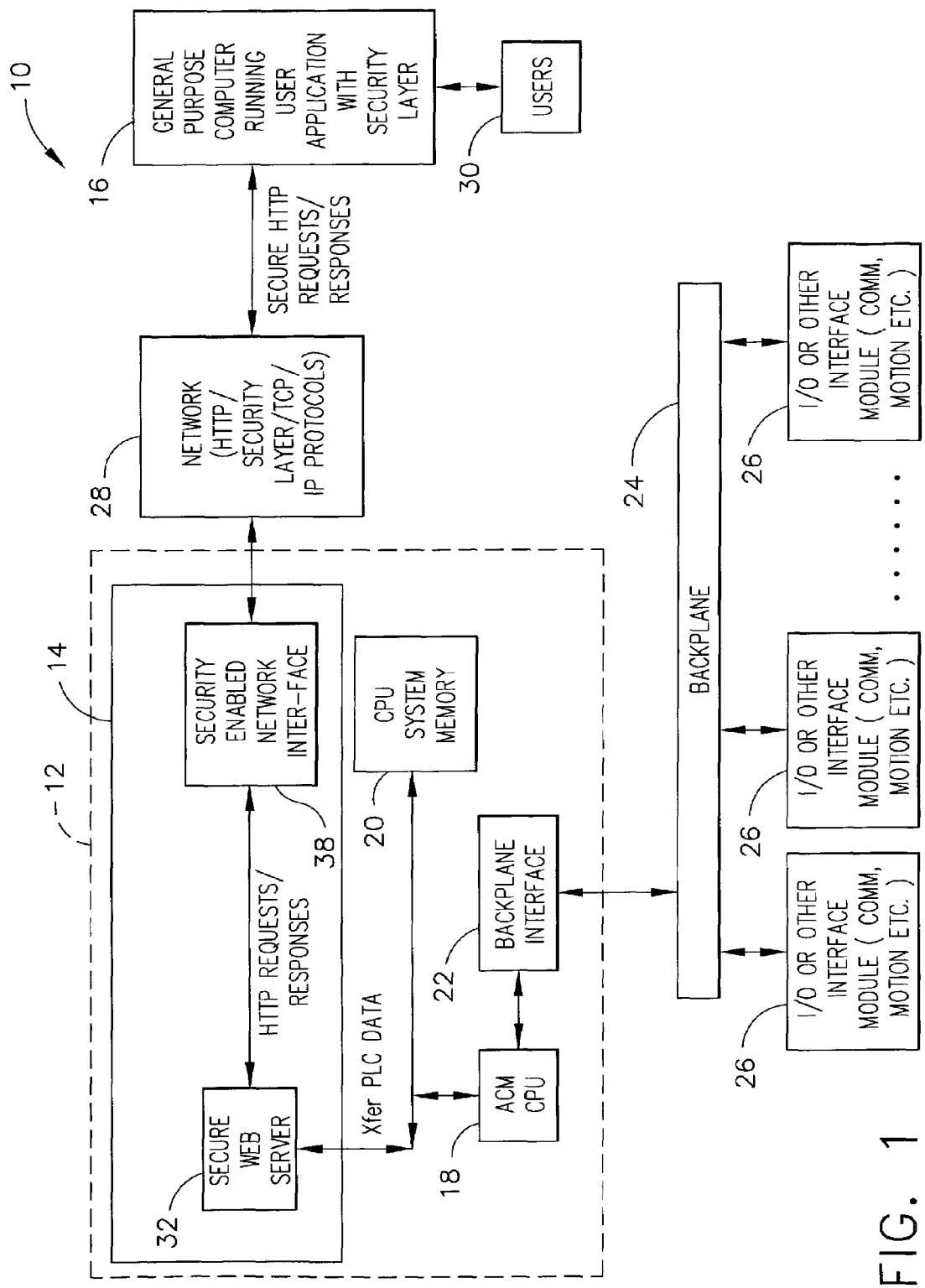
FIG. 1 is a block diagram illustrating one embodiment of an ACM system of the present invention.

FIG. 1 illustrates, in block diagram form, an exemplary hardware architecture that may be utilized in conjunction with an ACM management and control system. The system can be implemented on many different platforms and may utilize different architectures. The architectures illustrated in FIG. 1 are exemplary only.

FIG. 1 is a block diagram illustrating one embodiment of ACM system 10. System 10 includes an ACM 12, a web subsystem 14, and a computer 16. ACM 12 includes an ACM CPU 18 that executes ACM functions. For example, ACM CPU 18 may execute, but is not limited to executing, user logic and function block executions, input/output (I/O) scanning, and communications to other devices. ACM CPU 18 includes a CPU system memory 20 that is electrically coupled to CPU 18. In one embodiment, system memory 20 includes both the operating system (not shown) for ACM CPU 18, and a user's program and data. In one embodiment, an ACM I/O backplane interface 22 is connected to ACM CPU 18, and provides an interface between ACM CPU 18 and an ACM backplane 24 connected to interface 22. ACM backplane 24 provides a physical and an electrical means for connecting various I/O or other input modules 26, for example, communications or motion modules, into ACM 12. ACM backplane 24 facilitates data exchanges between modules 26 and ACM CPU 18. In one embodiment, at least one module 26 provides an interface for real world inputs (not shown), such as, but not limited to the limit or proximity switch status, the position of an object, the temperature, or the pressure, to ACM CPU 18 as parameters for logic or function block execution. In another embodiment, one or more modules 26 provide an interface to real world outputs (not shown) as commanded by ACM CPU 18 to control output devices (not shown), such as, but not limited to, actuators, contactors, or solenoids.

Computer 16 is electrically coupled to a network 28. Network 28 includes the physical medium and intermediate devices (not shown), such as routers, and switches, that connect computer 16 to eWeb ACM 12. In one embodiment, network 28 is a wide area network (WAN), such as the Internet. In an alternative embodiment, network 28 is a local area network (LAN), such as an Intranet. In the exemplary embodiment, a user 30 accesses an Intranet or the Internet to gain access to ACM 12. In one embodiment, computer 16 includes a web browser, and ACM 12 is accessible to computer 16 via the Internet. Computer 16 is interconnected to the Internet through many interfaces including, but not limited to, a different network (not shown), such as a WAN or a LAN, a dial in connection, a cable modem and a high-speed ISDN line. Computer 16 is any device capable of interconnecting to the Internet, and may include, a web-based telephone or other web-based connectable equipment.

Computer 16 executes a user application that makes decisions based on ACM data transferred from ACM 12 through a secure client connection through web subsystem 14 and network 28. Computer 16 displays ACM data on at least one web page (not shown), and retrieves web page files (not shown) stored on a secure web server 32 embedded within web subsystem 14. The web page files are text files that may contain hypertext markup language (HTML), Javascript, and/or references to other files, such as image files to be displayed with the web page or Java Applets. In another embodiment, the web page files include ACM tag functions that reference ACM data stored in CPU system memory 20. The tag facilitates the exchange of data between ACM CPU 18 and web server 32 embedded within web and file transfer subsystem 14. Additionally, the tag provides a generic mechanism for user 30 to display and/or control ACM data using a standard browser. In one embodiment, computer 16 includes web authoring tools and/or text editors that, along with user input, are utilized to create and modify web page files.

Users 30 include at least one person who views and/or controls ACM data using computer 16. In one embodiment, users 30 include a person who created a web page file. Web subsystem 14 is electrically connected to ACM CPU 18, CPU system memory 20, and network 28. Subsystem 14 is shown in FIG. 1 as embedded within ACM 12. In an alternative embodiment, subsystem 14 is contained in a separate module coupled to ACM backplane 24. Web subsystem 14 includes secure web server 32 and a secure network interface 38 that provides the lower level protocols (TCP/IP) and physical hardware connections to network 28 in a secure fashion. Secure web server 32 is electrically coupled to network interface 38, ACM CPU 18, and CPU system memory 20. More specifically, secure web server 32 provides a secure connection between secure web server 32 and computer 16 using a secure layer, such as, but not limited to, a secure sockets layer (SSL). In one embodiment, user 30 must enter a valid user name and valid user password to access ACM 12 and web subsystem 14. The user name and user password correspond to a user profile stored in secure web server 32. The user name and user password serve to authenticate secure web server 32 to computer 16 or alternatively, authenticate computer 16 to secure web server 32.

Upon accessing web subsystem 14, computer 16 and secure web server 32 communicate securely using security layer encrypted messages, based on mutually agreed to session keys for encryption and decryption, through network 28 and network interface 38. In one embodiment, server 32 and computer 16 communicate to select cryptographic algorithms that both server 32 and computer 16 support. Once a secure connection is established between secure web server 32 and computer 16, a user program on computer 16 generates a security layer encrypted hypertext transfer protocol (HTTP) request to access ACM data. Secure network interface 38 receives the request, decrypts the request and transfers the request to secure web server 32. Secure web server 32 processes the security layer encrypted hypertext transfer protocol (HTTP) requests to send web pages to computer 16 and, based upon the requests, sends a web page representing the requested web page through secure network interface 38 and network 28 to computer 16.

Secure network interface encrypts the web page representing the requested web page prior to sending it through network 28 to computer 16. Computer 16 decrypts the requested web page upon receiving the requested web page. If the requested web page includes a tag function, secure web server 32 parses and executes the tag function and either embeds ACM data within a web page file, thereby displaying the web page on a browser on computer 16, or transmits ACM data to ACM CPU 18. In one embodiment, secure web server 32 transfers ACM data to ACM CPU 18 to control operation of ACM 12.

Figure 2:
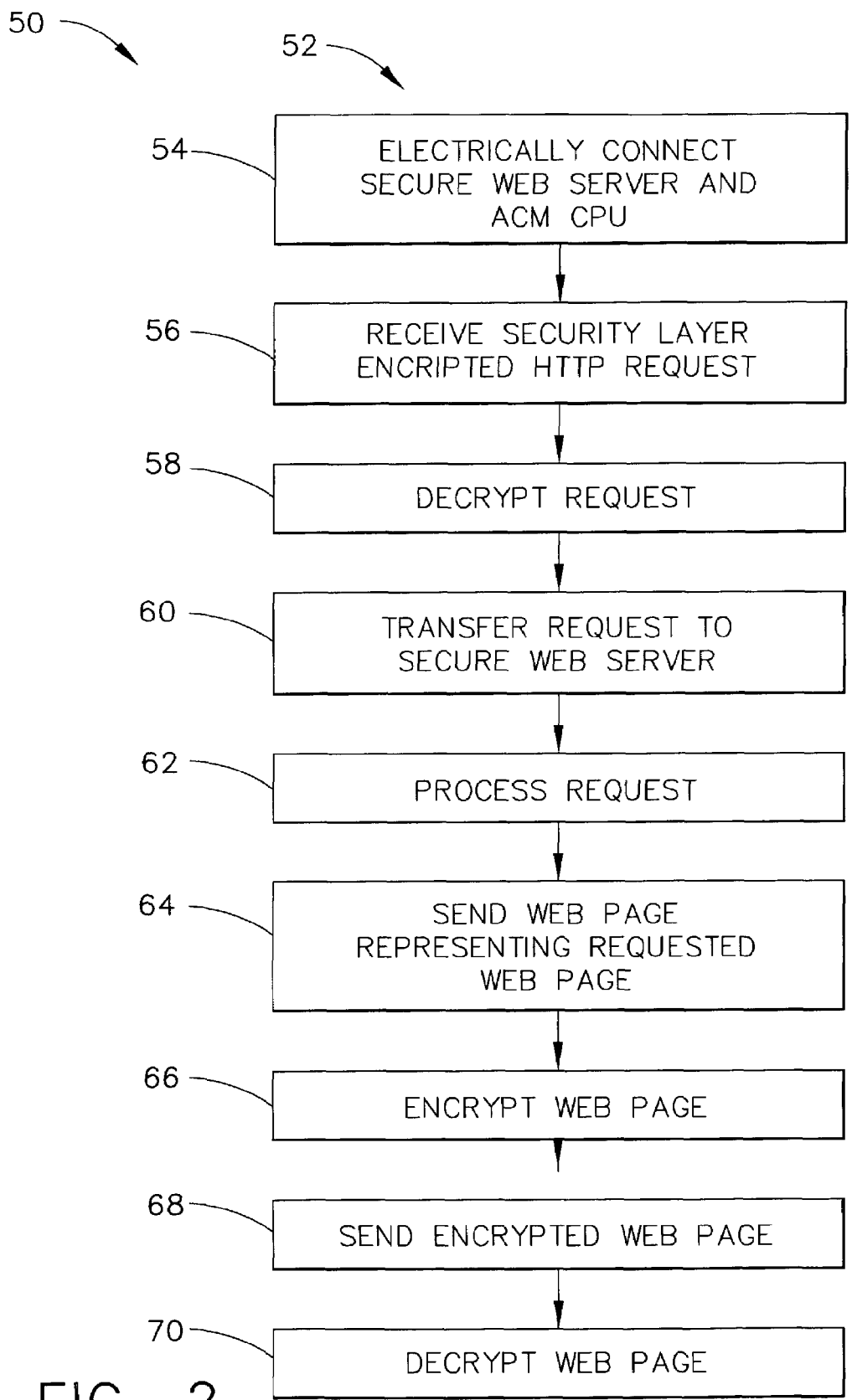
FIG. 2 is a flow chart illustrating one embodiment of a method for management and control of an automation control module using an ACM system.

FIG. 2 is a flow chart 50 illustrating an exemplary method 52 for management and control of ACM 12 (shown in FIG. 1). Method 52 includes electrically coupling 54 secure web server 32 (shown in FIG. 1) to ACM CPU 18 (shown in FIG. 1). Secure network interface 38 receives 56 a security layer encrypted HTTP request, decrypts 58 the request, and transfers 60 the request to secure web server 32. Secure web server 32 processes 62 the security layer encrypted HTTP requests to transmit web pages to computer 16 and, based upon the requests, transmits 64 a web page representing the requested web page to secure network interface 38, which encrypts 66 the web page representing the requested web page and transmits 68 it through network 28 to computer 16. Computer 16 decrypts 70 the requested web page upon receiving the requested web page. If the requested web page includes a tag function, secure web server 32 parses and executes the tag function and either embeds ACM data within a web page file thereby displaying the web page on a browser on computer 16, or transmits ACM data to ACM CPU 18. In one embodiment, secure web server 32 transfers ACM data to ACM CPU 18 to control operation of ACM 12.

ACM system 10 facilitates reducing system hardware costs, shortening development time of custom ACM monitoring and control tools that reduce implementation costs, and increasing response time for accessing ACM data while reducing an impact on other critical real-time ACM functions, such as ACM sweep time, thereby reducing production costs. In addition, ACM system 10 facilitates rapid access to ACM data on standard devices such as a web browser on computer 16 or PDA via a standard network in a secure fashion.

While the invention has been described in terms of various specific embodiments, those skilled in the art will recognize that the invention can be practiced with modification within the spirit and scope of the claims.

What is claimed is:

1. An automation control module (ACM) comprising:
    an ACM central processing unit (CPU) comprising a programmable logic controller (PLC) and a system memory comprising an operating system, a user program, and data;

a backplane interface electrically coupled to said ACM CPU and a backplane electrically coupled to said backplane interface; and a web system comprising a secure web server electrically coupled to said ACM CPU and a network, wherein said web system is embedded within said ACM, said secure web server configured to process security layer encrypted hypertext transfer protocol (HTTP) requests transmitted from a remote computer via the network based on session keys mutually agreed to by said web system and the remote computer, said web system configured to transfer ACM data from said ACM CPU to a secure network interface and embed said ACM data within at least one web page file based on function tags embedded within said at least one web page file, wherein said function tags provide a mechanism to control the ACM data by at least one of modifying said at least one web page file and creating a new web page file, and wherein said backplane is configured to couple said ACM CPU to at least one of a pressure sensor, a temperature sensor, and a proximity sensor.

2. An ACM in accordance with claim 1 wherein the security layer encrypted HTTP requests are encrypted using secure sockets layer (SSL).

3. An ACM in accordance with claim 1 wherein said secure network interface is configured to receive the security encrypted HTTP requests from the remote computer, decrypt the security encrypted HTTP requests from the remote computer, and transfer decrypted HTTP requests to said secure web server.

4. An ACM in accordance with claim 3 wherein said secure web server is configured to respond to the decrypted HTTP requests by processing the decrypted HTTP requests and transferring the responses to said secure network interface.

5. An ACM in accordance with claim 4 wherein said network interface is configured to receive the responses to the decrypted HTTP requests, encrypt the responses to the decrypted HTTP requests, and send the encrypted responses to the network.

6. An ACM in accordance with claim 3 wherein said secure web server comprises at least one web page file.

7. An ACM in accordance with claim 3 wherein said secure web server is configured to transfer ACM data from said ACM CPU to said secure network interface.

8. An ACM in accordance with claim 3 wherein said secure web server is configured to transfer ACM data to said ACM CPU.

9. An ACM in accordance with claim 3 wherein said secure web server is configured to transfer ACM data from said ACM CPU to said secure network interface and embed said ACM data within at least one web page file based on said function tags embedded within said at least one web page file.

10. An ACM in accordance with claim 3 wherein said web server is configured to send said at least one web page file through said secure network interface to the remote computer.

11. An ACM in accordance with claim 1 wherein said PLC is coupled to at least one of a pressure sensor and a temperature sensor 12. An automation control module (ACM) system comprising:

an ACM comprising a programmable logic controller (PLC) and an ACM CPU comprising a system memory, said system memory comprising an operating system, a user program, and data, said ACM further comprising a backplane interface electrically coupled to said ACM and a backplane electrically coupled to said backplane interface;

a network;

a computer electrically coupled to said network and configured to communicate with said network; and a web subsystem comprising a secure web server electrically coupled to said ACM and said network, wherein said web subsystem is embedded within said ACM, said secure web server configured to process security layer encrypted hypertext transfer protocol (HTTP) requests received from said computer through said network based on session keys coordinated by said computer and said web subsystem, said web subsystem configured to transfer ACM data from said ACM CPU to a secure network interface and embed said ACM data within at least one web page file based on function tags embedded within said at least one web page file, wherein said function tags provide a mechanism to control the ACM data by at least one of modifying said at least one web page file and creating a new web page file, and wherein said backplane is configured to couple said ACM CPU to at least one of a pressure sensor, a temperature sensor, and a proximity sensor.

13. An ACM system in accordance with claim 12 wherein said security layer encrypted HTTP requests are encrypted using secure sockets layer (SSL).

14. An ACM system in accordance with claim 12 wherein said secure network interface is configured to receive said security encrypted HTTP requests from said computer though said network, decrypted said security encrypted HTTP requests from said network, and transfer decrypted HTTP requests to said secure web server.

15. An ACM system in accordance with claim 14 wherein said secure web server is configured to respond to the decrypted HTTP requests by processing the decrypted HTTP requests and transferring the responses to said secure network interface.

16. An ACM system in accordance with claim 15 wherein said network interface is configured to receive said responses to the decrypted HTTP requests, encrypt said responses to the decrypted HTTP requests, and send the encrypted responses to through said network to said computer.

17. An ACM system in accordance with claim 16 wherein said computer is configured to decrypt the encrypted responses.

18. An ACM system in accordance with claim 12 wherein said secure web server comprises at least one web page file.

19. An ACM system in accordance with claim 12 wherein said secure web server is configured to transfer ACM data from said ACM CPU to said network interface.

20. An ACM system in accordance with claim 12 wherein said secure web server is configured to transfer ACM data to said ACM CPU.

21. An ACM system in accordance with claim 12 wherein said secure web server is configured to transfer ACM data from said ACM CPU to said secure network interface and embed said ACM data within said at least one web page file based on said function tags embedded within said at least one web page file.

22. An ACM system in accordance with claim 12 wherein said web server is configured to send said at least one web page file to said secure network interface.

23. A method for management and control of an automation control module (ACM), said method comprising:

providing an ACM central processing unit (CPU) including a system memory having an operating system, a user program, and data, a backplane interface electrically coupled to the ACM CPU, a backplane electrically coupled to the backplane interface, a programmable logic controller (PLC), and a web system electrically coupled to the ACM and a network;

electrically coupling the web system including a web server to the ACM CPU and a secure network interface, the secure network interface electrically connected to a network, wherein the web system is embedded within the PLC, and wherein the backplane is configured to couple the ACM CPU to at least one of a pressure sensor, a temperature sensor, and a proximity sensor;

processing security layer encrypted hypertext transfer protocol (HTTP) requests from a remote computer using the web system and based on session keys mutually agreed to by the remote computer and the web system comprising:

receiving the security layer encrypted HTTP requests from the network using the network interface;

decrypting the request; and transferring the decrypted requests to the web server;

transferring ACM data from the ACM CPU using the web system;

embedding the ACM data within at least one web page file based on function tags embedded within the at least one web page file; and providing, via the function tags, a mechanism to control the ACM data by at least one of modifying the at least one web page file and creating a new web page file.

24. A method in accordance with claim 23 wherein said processing security layer encrypted HTTP requests from the network using the web system further comprising:

processing the decrypted request using the web server;

transferring a web page representing a requested web page to the secure network interface;

encrypting the web page representing the requested web page using the secure network interface; and sending the encrypted web page representing the requested web page through the network.

\* \* \* \* \*